(12) United States Patent
Rohde

(10) Patent No.: US 11,907,880 B2
(45) Date of Patent: Feb. 20, 2024

(54) SYSTEMS AND METHODS FOR WORKFLOW VISUALIZATION IN A MULTI-TENANT MANAGEMENT PLATFORM

(71) Applicant: Salesforce, Inc., San Francisco, CA (US)

(72) Inventor: Sönke Rohde, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/589,444

(22) Filed: Jan. 31, 2022

(65) Prior Publication Data

US 2023/0245025 A1    Aug. 3, 2023

(51) Int. Cl.
G06Q 10/0633    (2023.01)
G06Q 10/0631    (2023.01)

(52) U.S. Cl.
CPC . *G06Q 10/0633* (2013.01); *G06Q 10/063114* (2013.01)

(58) Field of Classification Search
CPC .......................................... G06Q 10/00–50/00
USPC ................................. 705/7.11–7.42
See application file for complete search history.

(56) References Cited

U.S. PATENT DOCUMENTS

| | | | | |
|---|---|---|---|---|
| 8,700,738 B2* | 4/2014 | Moore | ................... | H04L 67/565 709/219 |
| 9,626,637 B2* | 4/2017 | Winters | ........... | G06Q 10/06311 |
| 9,887,891 B2* | 2/2018 | Abou Mahmoud | .... | H04L 51/52 |
| 10,296,717 B2* | 5/2019 | Isaacs | ..................... | G16H 20/10 |
| 10,395,220 B2* | 8/2019 | Lopez Venegas | .. | H04L 12/1818 |
| 10,423,909 B2* | 9/2019 | Winters | ........... | G06Q 10/06311 |
| 10,769,563 B2* | 9/2020 | Winters | .......... | G06Q 10/063114 |
| 11,282,006 B2* | 3/2022 | Tolica | ................ | G06Q 10/1095 |
| 11,416,790 B2* | 8/2022 | Winters | ........... | G06Q 10/06311 |
| 2005/0071740 A1* | 3/2005 | Chee | ......................... | G06F 9/52 715/272 |
| 2007/0083283 A1* | 4/2007 | Ara | ................ | G06Q 10/063114 700/111 |
| 2011/0264745 A1* | 10/2011 | Ferlitsch | .............. | G06Q 10/109 709/204 |
| 2011/0314404 A1* | 12/2011 | Kotler | .................. | G06Q 10/109 715/772 |

(Continued)

*Primary Examiner* — Alan S Miller
(74) *Attorney, Agent, or Firm* — Haynes and Boone LLP

(57) ABSTRACT

Embodiments described herein provide a workflow visualization tracking tool based on text mining on a conversation channel. Specifically, a communication interface receives a plurality of user activity items that are related to a shared work item among the plurality of tenants. A first sequence of status indicators representing a workflow progress of the shared work item over a plurality of time instances may be generated from the plurality of user activity items. A first subset of the plurality of user activity items are determined, which are related to at least one sub-item reflected in the first sequence of status indicators. A second sequence of status indicators representing a second workflow progress of the at least one sub-item over the plurality of time instances may be generated from the first subset of the user activity items. The first sequence of status indicators and the second sequence of status indicators may be presented in a visualization structure via a user interface.

20 Claims, 11 Drawing Sheets

(56) References Cited

U.S. PATENT DOCUMENTS

| | | | | |
|---|---|---|---|---|
| 2014/0082107 A1* | 3/2014 | Gosling | ............... | H04L 51/52 |
| | | | | 709/206 |
| 2016/0212022 A1* | 7/2016 | Abou Mahmoud | .... | H04L 51/52 |
| 2016/0335414 A1* | 11/2016 | Isaacs | ................ | G16H 40/40 |
| 2017/0310716 A1* | 10/2017 | Lopez Venegas | ............ | |
| | | | | G06Q 10/1093 |
| 2018/0075387 A1* | 3/2018 | Kulkarni | ............ | G06Q 10/103 |
| 2018/0096282 A1* | 4/2018 | Ready | ................ | G06F 16/284 |
| 2018/0268345 A1* | 9/2018 | Tolica | ............... | G06Q 10/107 |

\* cited by examiner

SYSTEMS AND METHODS FOR WORKFLOW VISUALIZATION IN A MULTI-TENANT MANAGEMENT PLATFORM

CROSS REFERENCES

This application is related to co-pending and commonly owned U.S. application Ser. No. 17/589,487 filed on Jan. 31, 2022, which is hereby expressly incorporated by reference herein in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure generally relates to applications of automated project management and more specifically to systems and methods for workflow visualization in a multi-tenant management platform.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Multi-tenant management platforms have been used to provide applications in project management, permitting multiple parties to access data resources and manage. For example, a management platform may be used to track the progress of a construction project, docketing task items, and/or keeping records of inventory. Existing systems often reply on users to manually provide status information of an ongoing workflow for project management purpose. In addition to maintaining a project progress diary, a user may also manually upload a progress report, intermediate evaluation results, and/or the like to the system to mark the milestones of project management. However, these manual labors can be time-consuming, and may not be as inclusive and accurate as desired.

Therefore, there is a need for a more efficient mechanism for project workflow tracking.

Figure 1:
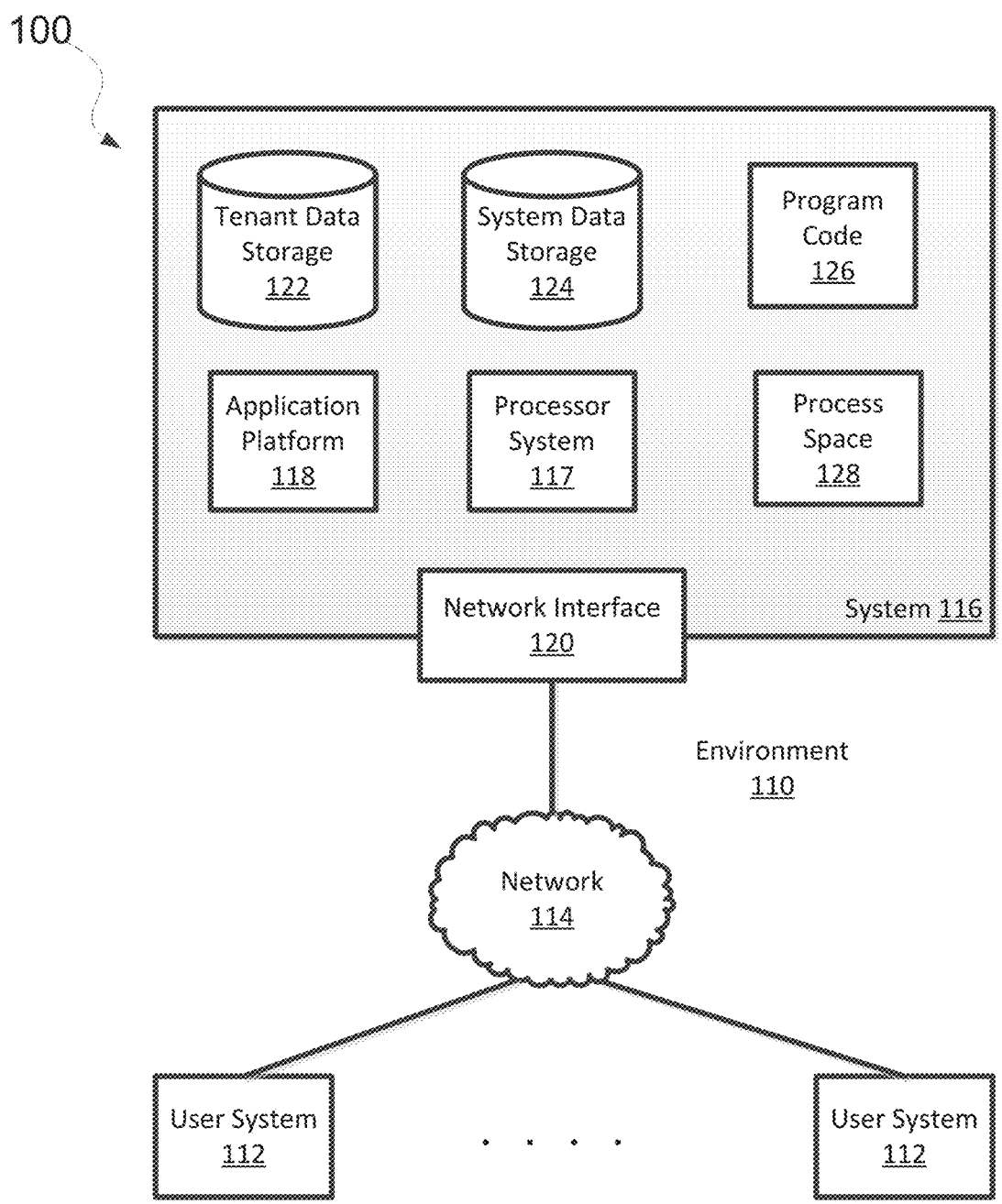
FIG. 1 illustrates a block diagram of an example environment wherein systems and methods for workflow visualization in a multi-tenant system may be provided and used according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As used herein, the term "conversation" may be used to refer to any audio, textual communication in any other media form. For example, the conversation may include a shared post on an online platform, a real-time dialogue, and/or the like.

As used herein, the term "channel" may be used to refer to a communication group on a communication platform for conducting conversations relating to certain topics associated with the communication group.

As used herein, the term "network" may include any hardware or software-based framework that includes any artificial intelligence network or system, neural network or system and/or any training or learning models implemented thereon or therewith.

As used herein, the term "module" may include hardware or software-based framework that performs one or more functions. In some embodiments, the module may be implemented on one or more neural networks.

Overview

Embodiments described herein provide a workflow visualization tracking tool based on text mining on a conversation channel. Specifically, the tracking tool automatically imports conversational data posted from multiple parties relating to a work project on a conversation channel, and extracts information indicating progress of the work project from the conversational data. The tracking tool may generate a tracking visualization presentation representing the workflow of the project. The visualization presentation includes a horizontal branch of visual elements representing an overall progress of the work project, and multiple vertical branches stemming from the horizontal branch representing progresses of multiple sub-topics of the work project.

In one embodiment, the visualization presentation may include a tree structure that expands in at least two directions: horizontally and vertically. The horizontal growth of a trunk may represent the workflow progress in the general development stages of a project over time, while side branches that grow vertically may represent the development of a specific sub-project within a certain stage. The tree structure may comprise various nodes, each representing user reactions relating to the project development at the time. For example, the size of the node may represent the number of messages relating to a certain topic of project development. For another example, different colors of nodes may represent messages and/or other activities contributed by different users.

In this way, the resulting tree structure may provide a visualized overview of the project development. In one embodiment, a user may determine analytics information of project progress based on a pattern type of the tree structure.

Example Environment

The system and methods of the present disclosure can include, incorporate, or operate in conjunction with or in the environment of a database, which in some embodiments can implemented as a multi-tenant, cloud-based architecture. For example, a multi-tenant cloud-based architecture may support an online project management platform on which multiple parties can communicate and share posts of texts, photos, videos and/or other media forms.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application features between multiple sets of users. In some embodiments, the multi-tenant architecture may provide the data table transformation from an unstructured table to a one-dimensional relational table, as discussed herein.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. In some implementations, the on-demand database service may include operations on a relational database. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants stored into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational data base management system (RDBMS) or the equivalent may execute storage and retrieval of information against the data base object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third-party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate. Such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 16 may provide tenant access to multiple hosted (standard and custom) applications, including a CRM application. User (or third-party developer) applications, which may or may not include CRM, may be supported by the application platform 118, which manages creation, storage of the applications into one or more database objects, and executing of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, PDA, cell phone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the multi-tenant database system) of the user systems 112 to access, process, and view information, pages, and applications available to it from the system 116 over the network 114. Each of the user systems 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object-oriented data base management system (OODBMS) or relational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
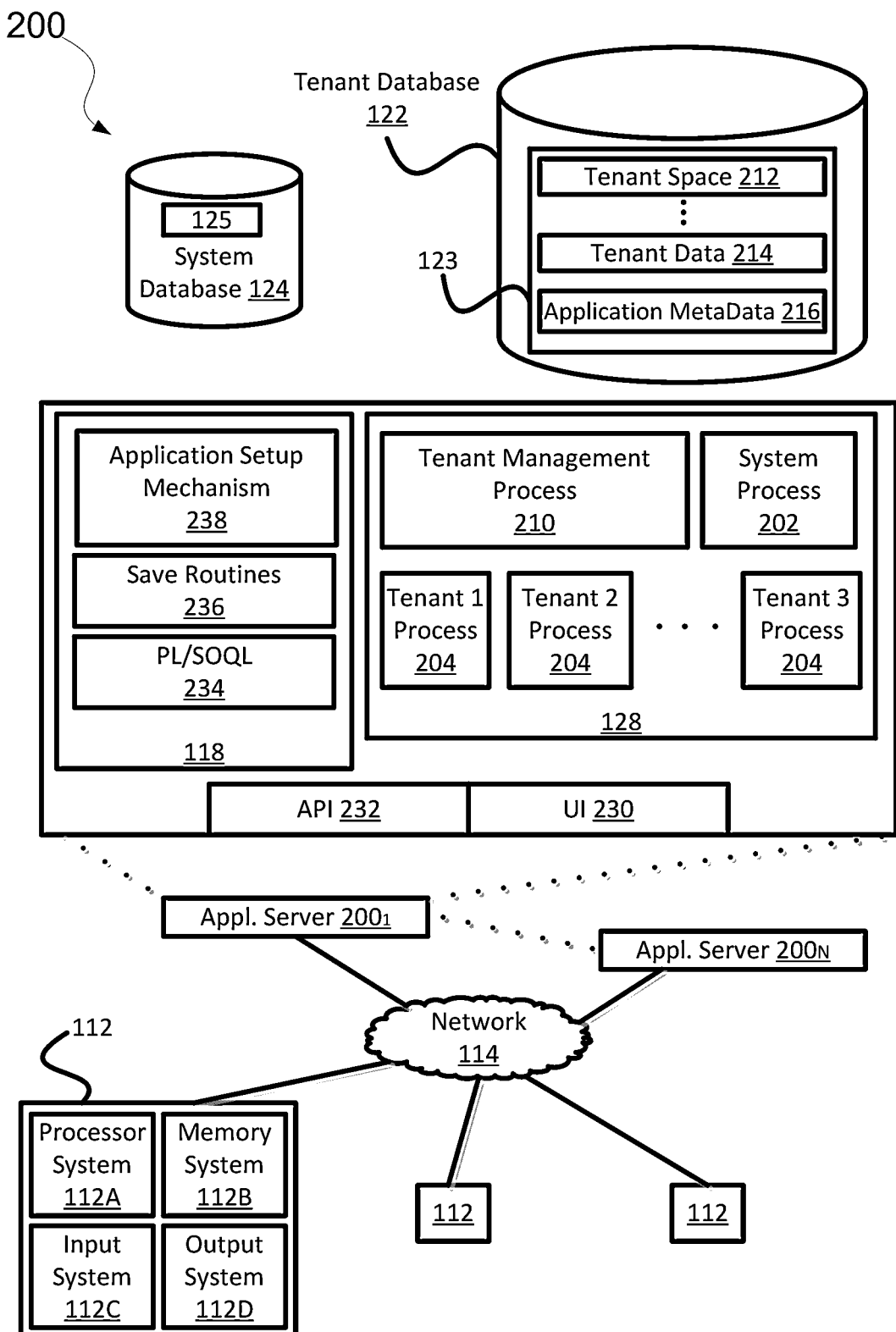
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a PL/Salesforce.com object query language (PL/SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short-term, and/or long-term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIG. 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process space 210, for example. Invocations to such applications may be coded using PL/SOQL 234 that provides a programming language style interface extension to the API 232. Some embodiments of PL/SOQL language are discussed in further detail in U.S. Pat. No. 7,730,478, filed Sep. 21, 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

In a customer relationship management (CRM) system, for example, these categories or groupings can include various standard case tables for a case submitted to the system and the responses to the case, including help requests, data processing requests, annotated data generation requests, and other customer requests. For example, a CRM database may include a table that describes a customer request and may include the customer data and resulting response. In a CRM database and system providing an object localization framework that utilizes a pipeline of algorithmic approaches, machine learning processes, and/or neural networks to locate and classify objects in images, the CRM database may include one or more tables representing unannotated image data and resulting annotated image data. The annotated image data may include customer results from the unannotated image data and may further be used to train a neural network provided by the CRM system. In some multi-tenant database systems, tables might be provided for use by all tenants or may be only viewable by some tenants and agents (e.g., users and administrators) of the system.

In some multi-tenant database systems, tenants may be allowed to create and store custom objects, or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The multi-tenant database system 116 described above may be accessed and used by a number of customers, clients, or other persons (generally, "users") regarding object localization in image data. To facilitate interaction between the database system 116 and the user, a search bar, voice interface, data upload process, or similar user interface tool is provided. The interface tool allows a user to submit unannotated image data requiring object localization through the framework provided herein (e.g., object bounding box generation identifying an object, as well as object class labels for classification). The interface tool further allows a user to see the results of object localization, provide feedback on the resulting bounding box generation, request processing using different object localization processes discussed herein, and receive the resulting annotated data used for neural network training.

For neural networks providing object detection (e.g., detecting instances of semantic objects of a certain class in images or videos), large amounts of annotated data are required to receive good object detection results. For example, tens of thousands or more annotated images having bounding box information of an object and classification may be required to identify an object. Moreover, for detection of multiple different types of objects, class labels, and other semantic items in images, billions of different annotated images showing those different semantic items may be requires. Thus, a customer of the CRM system must provide large amounts of manpower to manually label images. This introduces human error into the process of annotating data. Furthermore, a database system may require large amounts of resources to store different sets of image data. It is a difficult task to train neural networks. In a multi-tenant system, such as Salesforce.com, a customer may be required to utilize a large amount of resources to train a neural network for object detection. Continuing with the example, because the customer may be interest in quickly training a neural network without using valuable manpower and database resources, it may be desirable or preferable that the unannotated image data is annotated using an automated framework that requires no or minimal user input to generate bounding box information and other annotations in unlabeled or unannotated image data. As such, according to some embodiments, systems and methods are provided for generating annotated data for object detection neural networks.

According to some embodiments, in a multi-tenant database system accessible by a plurality of separate and distinct organizations, such as system 116 shown and described with respect to FIGS. 1 and 2, a conversation analytics module is provided for converting scattered conversation snippets and posts on the online conversation platform into summaries for analytics. The conversation analytics module may be installed or implemented at a computing device shown in FIG. 3.

Figure 3:
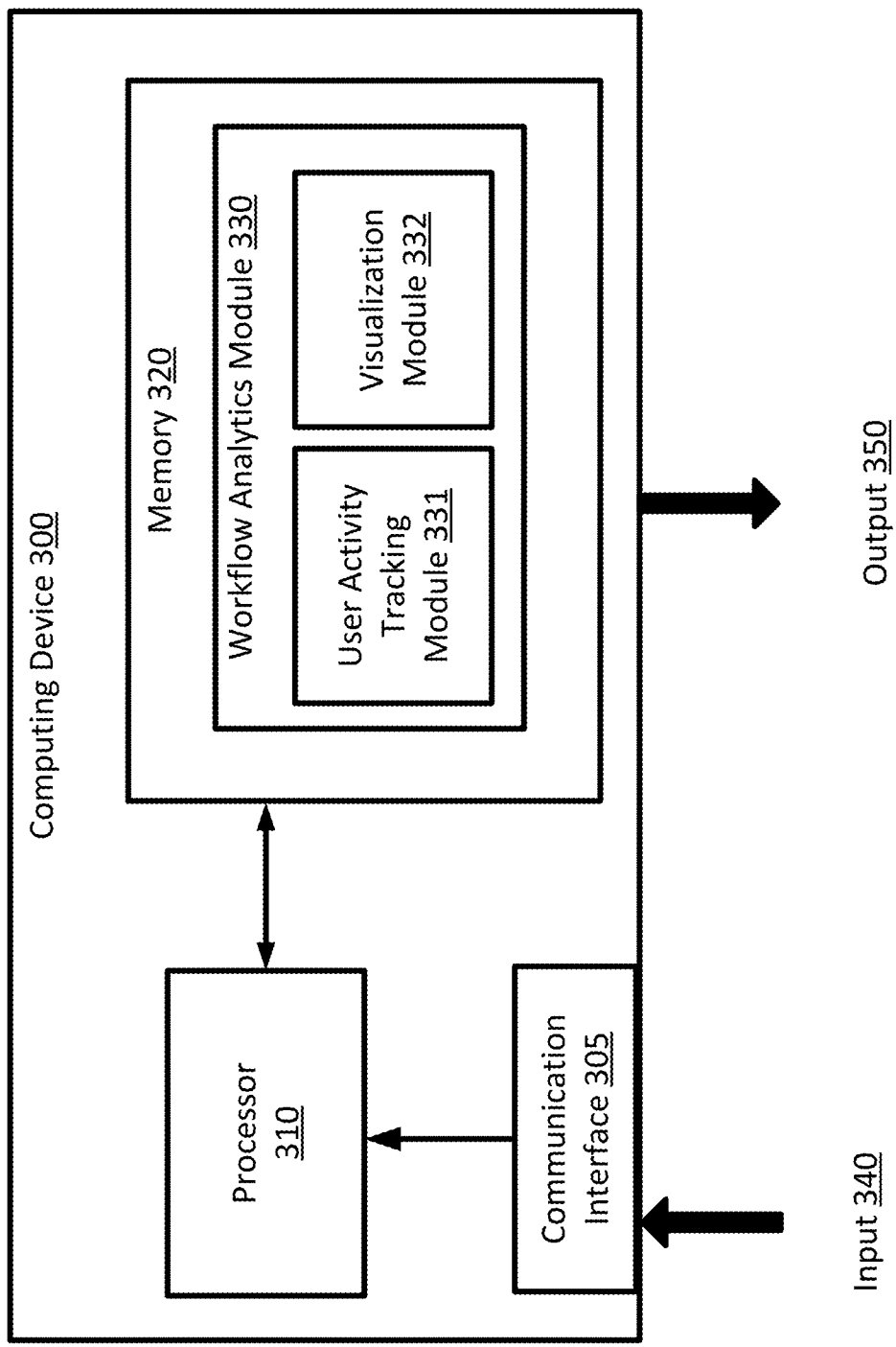
FIG. 3 is a simplified diagram of a computing device implementing workflow visualization in a multi-tenant management platform, according to some embodiments.

FIG. 3 is a simplified diagram of a computing device 300 according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities. In some examples, memory 320 may include non-transitory, tangible, machine readable media that includes executable code that when run by one or more processors (e.g., processor 310) may cause the one or more processors to perform any of the methods described further herein.

As shown, memory 320 includes a workflow analytics module 330 for generating a visualization presentation for tracking project development from input 340 into outputs 350 of visualized analytics. For example, the input 340 may include conversation data from a project platform including text messages, emojis, photos, user actions (e.g., "likes" or "dislikes"), charts, videos, calendar event data, meeting minutes, presentations, and/or other forms of media. Computing device 300 can receive the input 340 through a user interface, a communication interface 305 via a communication network, and/or the like.

The workflow analytics module 330 further includes sub-modules such as the user activity tracking module 331 and visualization module 332. Specifically, the user activity tracking module 331 may collect and parse various types of user activity data for project information. In one implementation, the user activity tracking module 331 is configured to generate statistics and summaries of the conversation messages. The visualization module 332 is configured to generate visualization elements based on generated project development analytics from submodule 331, as further illustrated in FIGS. 6A-8B.

In one embodiment, the conversation analytics module 330 and its submodules 331-332 may be implemented through software, hardware and/or a combination of both.

Example Workflow Analytics

Figure 4:
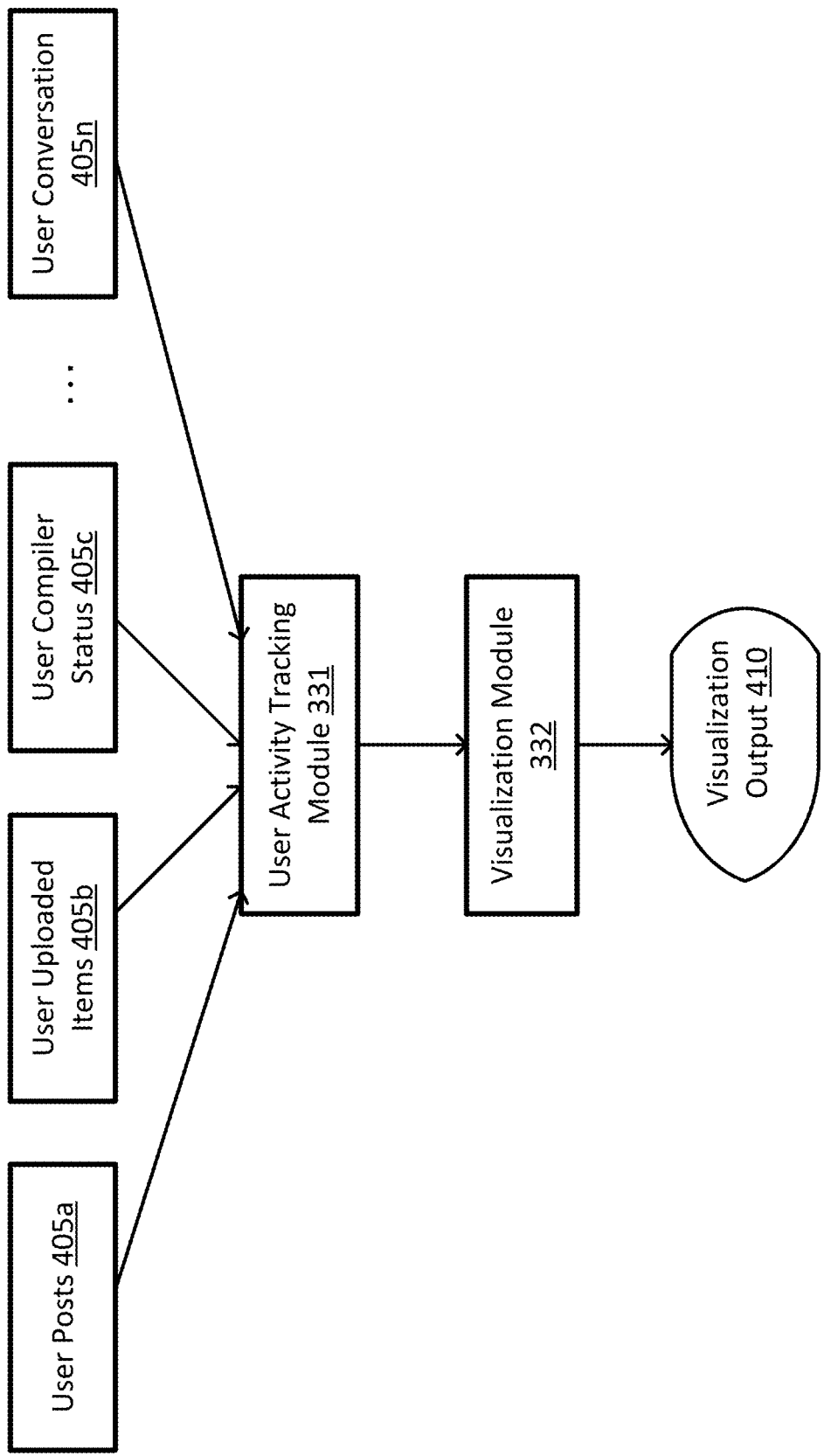
FIG. 4 is a simplified block diagram illustrating an example data flow for workflow visualization, according to some embodiments.

FIG. 4 is a simplified block diagram illustrating an example data flow for workflow visualization, according to some embodiments. In one embodiment, the user activity tracking module 331 may collect various types of user activity items relating to the project development, such as user posts 405a, user uploaded documents and/or other media files 405b, user complier status 405c, user conversation 405n, and/or the like. In another implementation, the user activity items may further include automatically parsed user calendar events (e.g., a scheduled presentation webinar, etc.), reminders, follow-up item status, and/or the like.

In one embodiment, the user activity tracking module 331 may constantly, intermittently or periodically monitor the various user activity items 405a-n. For example, the user activity tracking may be updated on a daily basis to track updates for the past 24 hours.

The user activity tracking module 331 may then generate project analytics data based on the collected user activity items 405a-n. For example, user conversation messages on a channel that is designated to a particular project may be summarized by a summarization model, which may appear as a node on the tree structure.

The visualization module 332 may generate visualization presentations 410 of the analytics generated by the user activity tracking module 331. Various example visualization output 410 may be shown in FIGS. 6A-8B.

Figure 5:
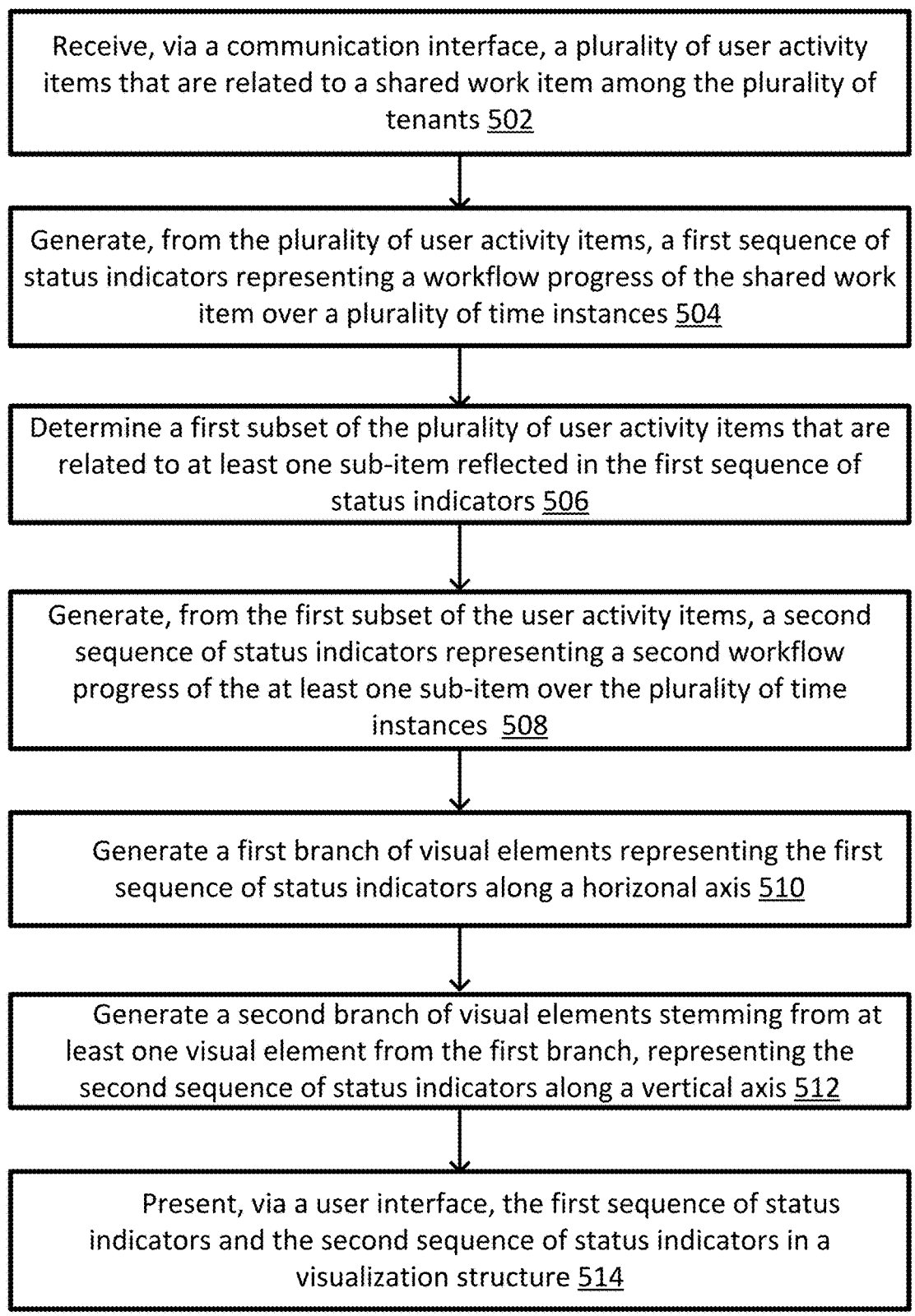
FIG. 5 is a simplified logic flow diagram illustrating a method of workflow visualization in a multi-tenant database system, according to some embodiments.

FIG. 5 is a simplified logic flow diagram illustrating a method of workflow visualization in a multi-tenant database system, according to some embodiments. The example method 500 including processes 502-514 may be implemented, at least in part, in the form of executable code stored on non-transitory, tangible, machine-readable media that when run by one or more processors may cause the one or more processors to perform one or more of the processes 502-514. In some embodiments, these processes may correspond to the method used by the workflow analytics module 330 to perform contextual conversation summarization in a conversation platform.

At process 502, a communication interface may receive a plurality of user activity items that are related to a shared work item among the plurality of tenants. For example, the plurality of user activity items comprise a first conversation line from a first user and a second conversation line from a second user. A natural language processing model may be used to generate a summary of the first conversation line and the second conversation line, and a status indicator may be generated based on the summary.

In another implementation, the plurality of user activity items comprise a user action of sharing or uploading a work document. Then one or more texts may be generated from one or more structural fields of the work document, such as title, version number, and/or the like, based on which a status indicator may be generated.

At process 504, a first sequence of status indicators representing a workflow progress of the shared work item over a plurality of time instances may be generated from the plurality of user activity items. For example, the first sequence of status indicators are presented by a first visual element indicating a contribution from a first user, and a second visual element indicating a contribution from a second user.

At process 506, a first subset of the plurality of user activity items are determined, which are related to at least one sub-item reflected in the first sequence of status indicators. For example, the at least one sub-item may be determined by grouping the first sequence of status indicators based on similarities between status indicators.

At process 508, a second sequence of status indicators representing a second workflow progress of the at least one sub-item over the plurality of time instances may be generated, from the first subset of the user activity items.

At process 510, a first branch of visual elements may be generated representing the first sequence of status indicators along a horizontal axis.

At process 512, a second branch of visual elements stemming from at least one visual element from the first branch may be generated, representing the second sequence of status indicators along a vertical axis. For example, the visual elements may comprise a cluster of emojis extracted from the plurality of user activity items.

At step 514, the first sequence of status indicators and the second sequence of status indicators in a visualization structure may be presented via a user interface. In this way, the user may review the visualization structure. Or alternatively, the system may automatically determine or recommend a type of the workflow progress of the shared work item based on a geometric pattern of the visualization structure. For example, the system may suggest which part of the project lacks proper progress by highlighting a section of the visualization structure where status indicator may be scarce.

Example Visualization

Figure 6A:
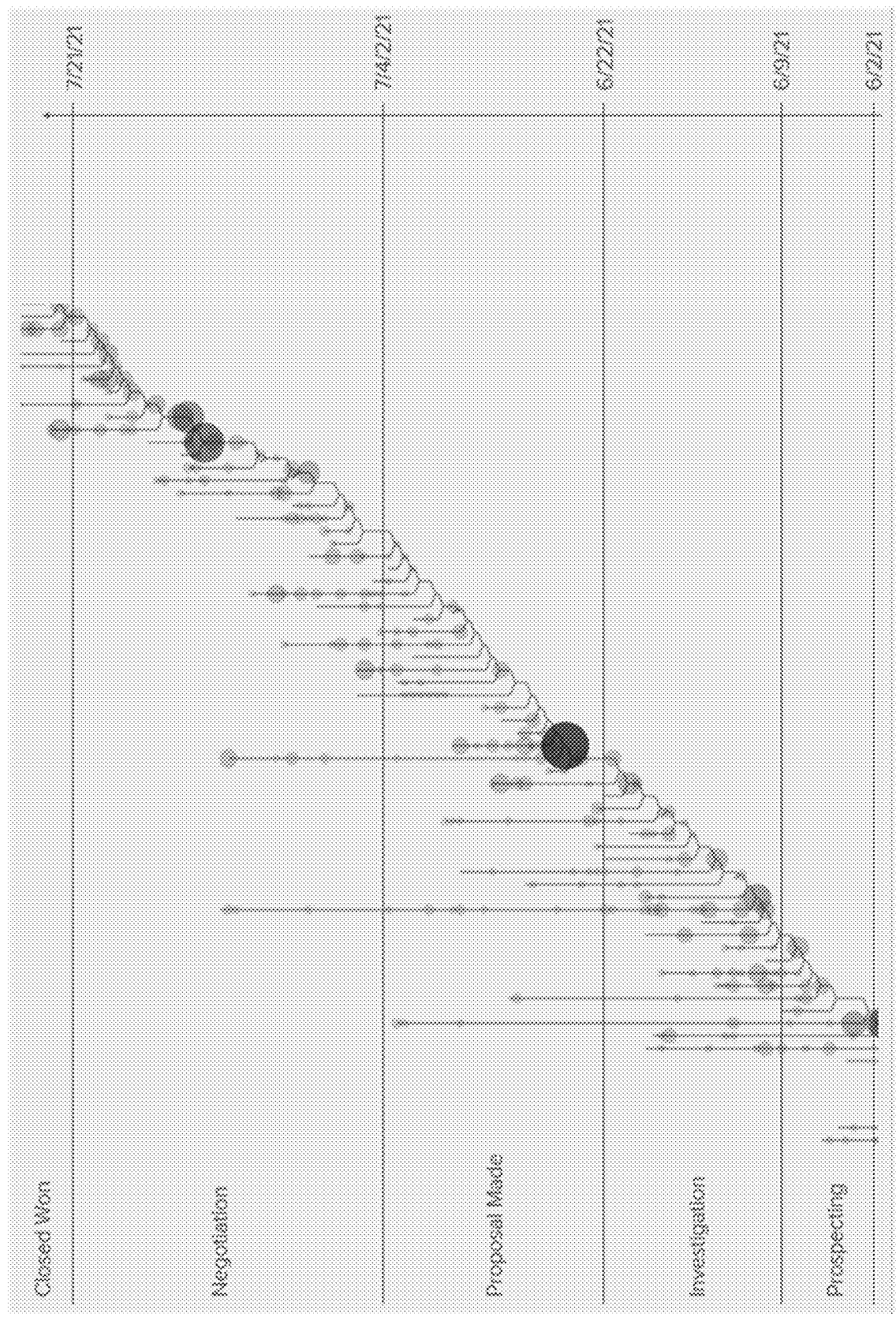
FIGS. 6A-6C are simplified diagrams illustrating example visualizations of workflow tracking, according to some embodiments.
Figure 6B:
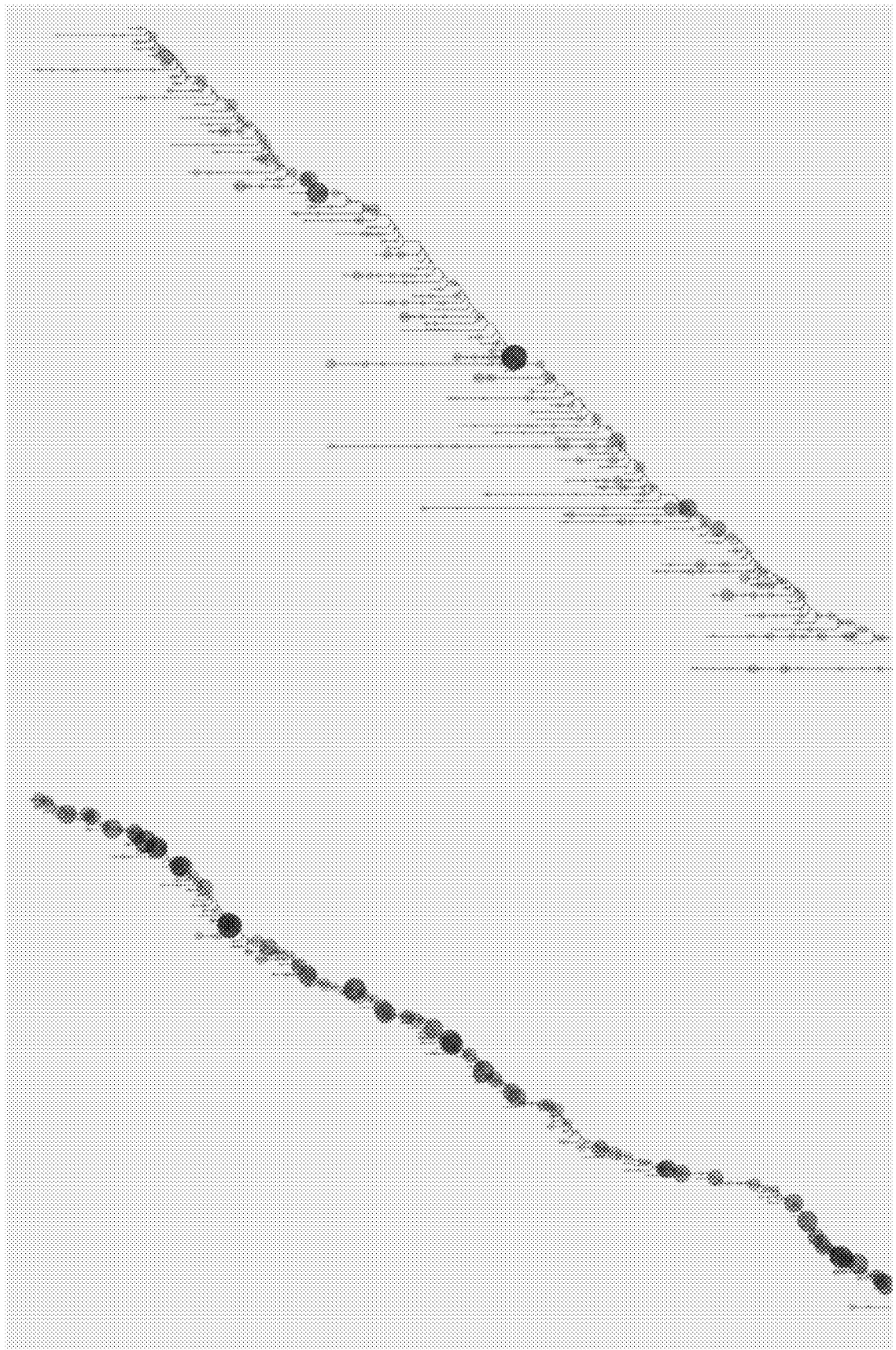
Figure 6C:
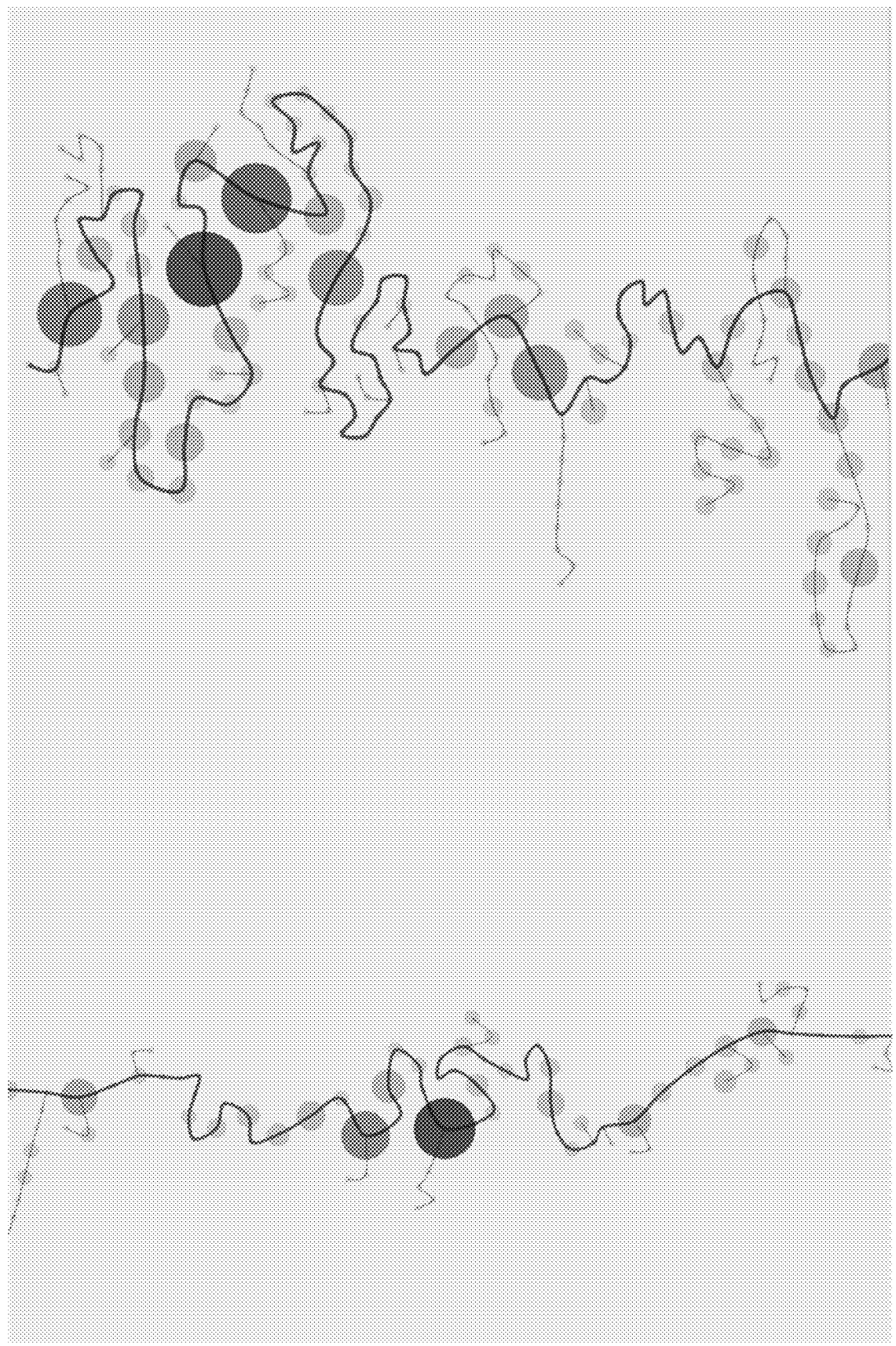

FIGS. 6A-6C are simplified diagrams illustrating example visualizations of workflow tracking, according to some embodiments. As shown in FIG. 6A, the time axis may increment vertically from bottom to top (and/or from left to right horizontally). The main branch represents the progression of the project from different stages: "prospecting," "investigation," "proposal made," "negotiation," and "closed won." The vertical branches represent threads or progression of a sub-item, e.g., such as a thread that was initiated during the stage "proposal made." The size of each node represents the number of reactions during a time period, e.g., an hour, a day, and/or the like.

FIGS. 6B-6C provide different examples of the visualization tree. In one embodiment, the different pattern types of the visualization tree may represent different types of project development progress.

Figure 7:
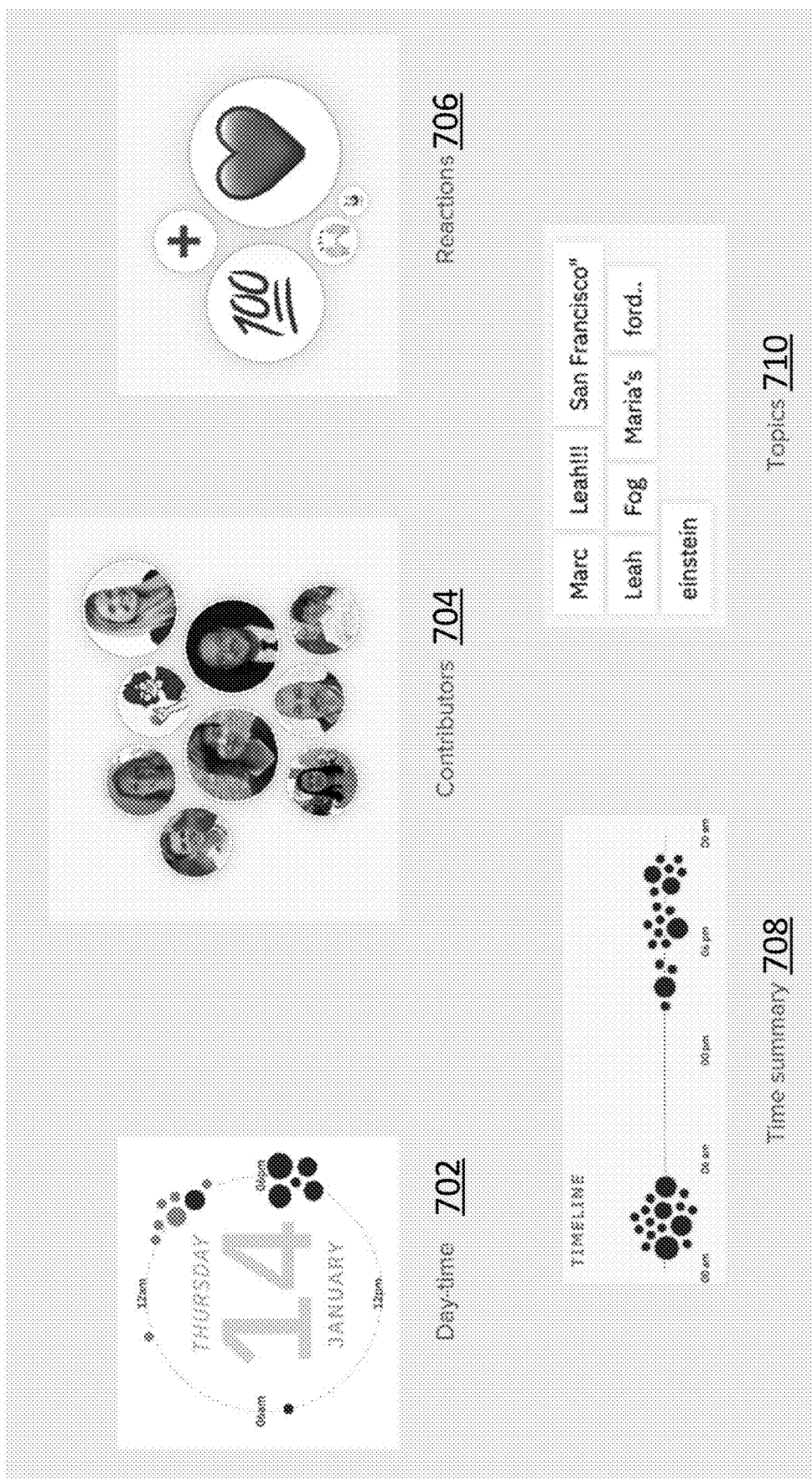
FIG. 7 is a simplified diagram illustrating examples of visual indicators used in the workflow visualization, according to some embodiments.

FIG. 7 is a simplified diagram illustrating examples of visual indicators used in the workflow visualization, according to some embodiments. A user interface is provided for a user to select a visualizer for presenting the summary of a conversation channel. For example, the visualizer may take the form as a daily summary 702, a timeline 708, an emoji cloud 706, a topic keyword array 710 and/or contributors 704. For example, as shown at structure 702 and 708, the size and the color of each node may represent the number of responses and/or messages generated by a certain user. Different color of the nodes may represent responses generated by different users. The timeline structure 708 may be generated as distributed cluster of nodes representing responses and/or messages along a time axis. In another implementation, the emoji cloud 706 may be extracted from messages posted relating to the shared work item, comprising emojis that have been used in the messages, which represent sentiments of the messages. In another implementation, a cluster of user (contributor) icons 704 may be presented, representing a distribution of user contribution. For example, the size of the user icon may relate to the volume and/or number of responses or messages the user has contributed to the conversation.

Figure 8A:
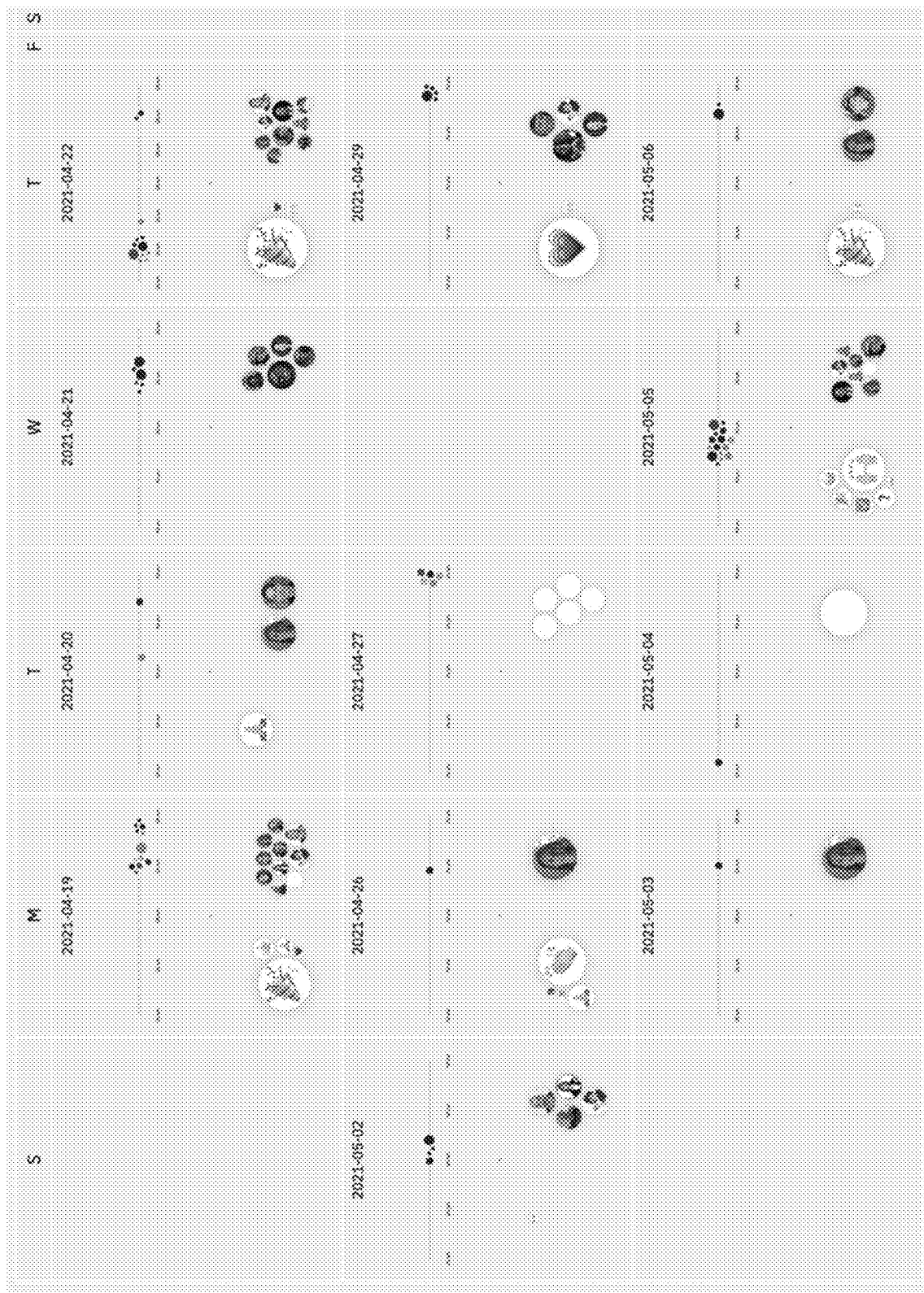
FIGS. 8A-8B are simplified diagrams illustrating different example user interfaces of calendar views of workflow tracking, according to some embodiments.
Figure 8B:

FIGS. 8A-8B are simplified diagrams illustrating different example user interfaces of calendar views of workflow tracking, according to some embodiments. For example, in FIG. 8A, a calendar view of the workflow visualization is provided, including a calendar grid view having daily summary of the project status. The daily summary may select any visualization elements from a timeline 708, an emoji cloud 706, a topic keyword array 710 and/or contributors 704 as shown in FIG. 7. FIG. 8B shows another example of calendar view of daily summaries, which shows an array of daily summaries 702 described in FIG. 7.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A method of workflow visualization in a multi-tenant database system, the method comprising:
   receiving, via a communication interface, a plurality of user activity items that are related to a shared work item among the plurality of tenants;
   generating, from the plurality of user activity items, a first sequence of status indicators representing a workflow progress of the shared work item over a plurality of time instances;
   determining a first subset of the plurality of user activity items that are related to at least one sub-item reflected in the first sequence of status indicators;
   generating, from the first subset of the user activity items, a second sequence of status indicators representing a second workflow progress of the at least one sub-item over the plurality of time instances;
   generating a first branch of visual elements representing the first sequence of status indicators along a horizontal axis;
   generating a second branch of visual elements stemming from at least one visual element from the first branch, representing the second sequence of status indicators along a vertical axis; and
   presenting, via a user interface, the first branch of visual elements representing the first sequence of status indicators and the second branch of visual elements representing the second sequence of status indicators in a visualization structure.

2. The method of claim 1, wherein the plurality of user activity items comprise a first conversation line from a first user and a second conversation line from a second user.

3. The method of claim 2, further comprising:
   generating, via a natural language processing model, a summary of the first conversation line and the second conversation line; and
   generating a status indicator from the summary.

4. The method of claim 1, wherein the plurality of user activity items comprise a user action of sharing or uploading a work document.

5. The method of claim 4, further comprising:
   extracting one or more texts from one or more structural fields of the work document; and
   generating a status indicator based on the one or more texts.

6. The method of claim 1, wherein the first sequence of status indicators are presented by a first visual element indicating a contribution from a first user, and a second visual element indicating a contribution from a second user.

7. The method of claim 1, further comprising:
   determining the at least one sub-item by grouping the first sequence of status indicators based on similarities between status indicators.

8. The method of claim 1, wherein at least one visual element from the first branch or the second branch comprises a cluster of emojis extracted from the plurality of user activity items.

9. The method of claim 1, further comprising:
   determining a type of the workflow progress of the shared work item based on a geometric pattern of the visualization structure.

10. A system for workflow visualization in a multi-tenant database system, the system comprising:
    a communication interface receiving a plurality of user activity items that are related to a shared work item among the plurality of tenants;
    a memory storing a plurality of processor-executable instructions; and
    a process executing the plurality of processor-executable instructions to perform operations comprising:
       generating, from the plurality of user activity items, a first sequence of status indicators representing a workflow progress of the shared work item over a plurality of time instances;
       determining a first subset of the plurality of user activity items that are related to at least one sub-item reflected in the first sequence of status indicators;
       generating, from the first subset of the user activity items, a second sequence of status indicators representing a second workflow progress of the at least one sub-item over the plurality of time instances;
       generating a first branch of visual elements representing the first sequence of status indicators along a horizontal axis;
       generating a second branch of visual elements stemming from at least one visual element from the first branch, representing the second sequence of status indicators along a vertical axis; and
       presenting, via a user interface, the first branch of visual elements representing the first sequence of status indicators and the second branch of visual elements representing the second sequence of status indicators in a visualization structure.

11. The system of claim 10, wherein the plurality of user activity items comprise a first conversation line from a first user and a second conversation line from a second user.

12. The system of claim 11, wherein the operations further comprise:
    generating, via a natural language processing model, a summary of the first conversation line and the second conversation line; and
    generating a status indicator from the summary.

13. The system of claim 10, wherein the plurality of user activity items comprise a user action of sharing or uploading a work document.

14. The system of claim 13, wherein the operations further comprise:
    extracting one or more texts from one or more structural fields of the work document; and
    generating a status indicator based on the one or more texts.

15. The system of claim 10, wherein the first sequence of status indicators are presented by a first visual element indicating a contribution from a first user, and a second visual element indicating a contribution from a second user.

16. The system of claim 9, wherein the operations further comprise:
    determining the at least one sub-item by grouping the first sequence of status indicators based on similarities between status indicators.

17. The system of claim 10, wherein at least one visual element from the first branch or the second branch comprises a cluster of emojis extracted from the plurality of user activity items.

18. The system of claim 10, wherein the operations further comprise:

determining a type of the workflow progress of the shared work item based on a geometric pattern of the visualization structure.

19. A processor-readable non-transitory storage medium storing a plurality of processor-executable instructions of workflow visualization in a multi-tenant database system, the instructions being executed by a processor to perform operations comprising:

receiving, via a communication interface, a plurality of user activity items that are related to a shared work item among the plurality of tenants;

generating, from the plurality of user activity items, a first sequence of status indicators representing a workflow progress of the shared work item over a plurality of time instances;

determining a first subset of the plurality of user activity items that are related to at least one sub-item reflected in the first sequence of status indicators;

generating, from the first subset of the user activity items, a second sequence of status indicators representing a second workflow progress of the at least one sub-item over the plurality of time instances;

generating a first branch of visual elements representing the first sequence of status indicators along a horizontal axis;

generating a second branch of visual elements stemming from at least one visual element from the first branch, representing the second sequence of status indicators along a vertical axis; and presenting, via a user interface, the first branch of visual elements representing the first sequence of status indicators and the second branch of visual elements representing the second sequence of status indicators in a visualization structure.

20. The processor-readable non-transitory storage medium of claim 19, wherein the plurality of user activity items comprise a first conversation line from a first user and a second conversation line from a second user.

* * * * *